Figure 1:
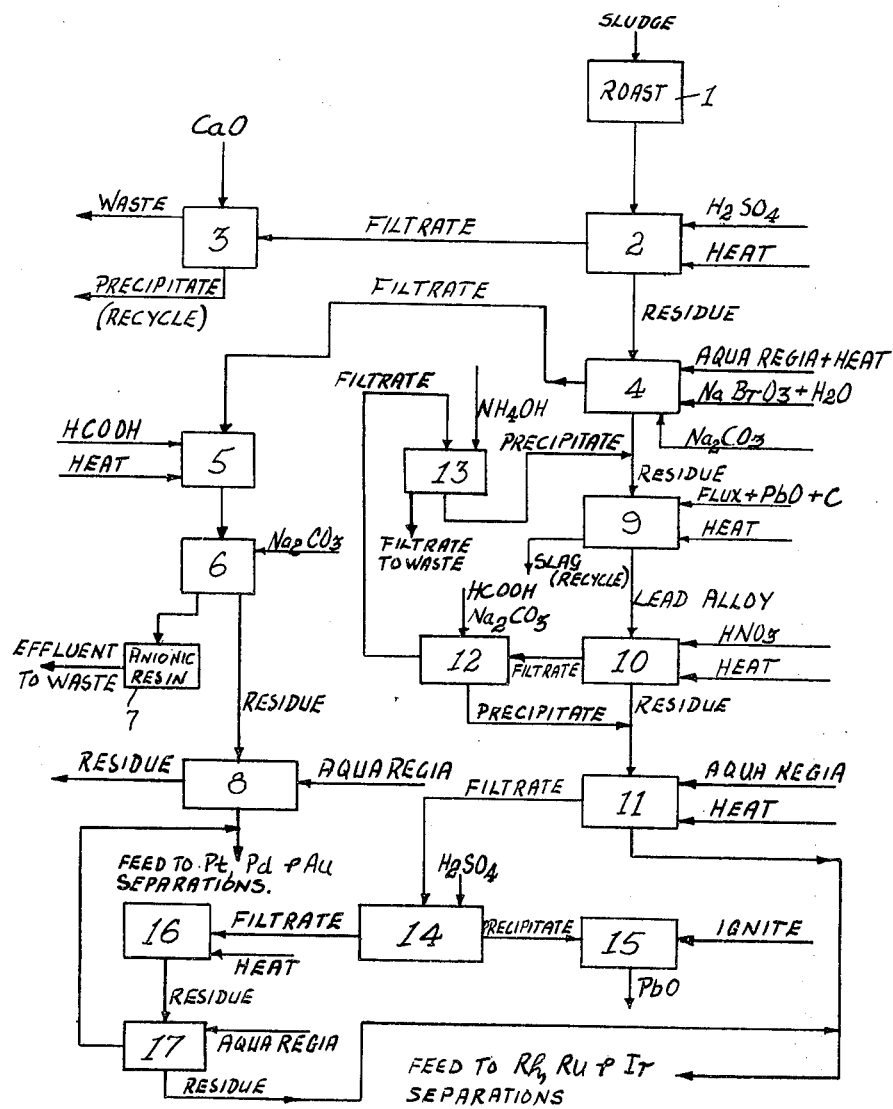

United States Patent [19]
Pittie et al.

[11] 3,929,469
[45] Dec. 30, 1975

[54] SEPARATION AND PURIFICATION OF GOLD

[75] Inventors: Willem Hubert Pittie, Roodepoort; Gerhardus Overbeek, Florida; Kingsley Ferguson Doig, Johannesburg, all of South Africa

[73] Assignee: Swarsab Mining, Exploration & Development Company (Proprietary) Limited, Johannesburg, South Africa

[22] Filed: July 23, 1974

[21] Appl. No.: 490,970

Related U.S. Application Data

[63] Continuation-in-part of Ser. No. 384,825, Aug. 2, 1973, abandoned.

[30] Foreign Application Priority Data

Aug. 10, 1972 South Africa............72/5488

[52] U.S. Cl.............. 75/108; 75/118; 75/121; 423/22; 423/34; 423/36; 423/38; 423/42
[51] Int. Cl.².................................. C01G 7/00
[58] Field of Search......... 75/108, 118, 121; 423/22

[56] References Cited
UNITED STATES PATENTS

| 2,714,555 | 8/1955 | Stevenson et al. ............ 423/22 |
| 2,875,040 | 2/1959 | Barabas ............ 75/108 X |
| 3,024,084 | 3/1962 | Raper et al. ............ 423/22 |

FOREIGN PATENTS OR APPLICATIONS
803,391  12/1973  Belgium

Primary Examiner—Herbert T. Carter
Attorney, Agent, or Firm—Berman, Aisenberg & Platt

[57] ABSTRACT

A method of separating gold from PGMs comprising evaporating to dryness (at least once) a nitric acid solution comprising gold and one or more PGMs, redissolving the obtained residue in nitric acid, adding hydrogen peroxide and boiling the resultant solution to precipitate and coagulate gold as the metal.

6 Claims, 2 Drawing Figures

SEPARATION AND PURIFICATION OF GOLD

RELATED APPLICATION

This application is a continuation-in-part of application Ser. No. 384,825, filed on Aug. 2nd, 1973, now abandoned.

BACKGROUND

In general, the five Platinum Group Metals (hereinafter referred to as "PGMs"), namely: platinum, palladium, iridium, ruthenium and rhodium, occur together in nature with gold and these six elements must be separated from each other and purified in order to be useful in trade or industry. In general, an initial separation of these elements into two groups is effected by treating the basic mixture, which is generally a matte leach residue or sludge, with aqua regia, in which case the platinum, palladium and gold dissolve whilst the iridium, ruthenium and rhodium remain substantially in the residue resulting from this process. The two groups of metals obtained in this manner are then subjected to generally long and complicated separation procedures in order to separate and purify the individual metals.

SUMMARY

This invention relates to the separation and purification of gold which is in admixture with PGMs.

It is the object of this invention to provide a method (for separating gold from Platinum Group Metals) which will be more easily carried out at least where high purity gold is required as a final product and/or which will facilitate the separation of the PGMs present with the gold.

In accordance with this invention there is provided a method of separating gold from PGMs comprising evaporating to dryness (at least once) a nitric acid solution comprising gold and one or more PGMs, redissolving thus-obtained residue in nitric acid, adding hydrogen peroxide thereto and boiling the resultant solution to precipitate and coagulate gold in metal form.

Further features of the invention provide for the solution (with nitric acid) of gold and one or more PGMs to be evaporated to dryness twice prior to the hydrogen peroxide treatment, for the process to be repeated on the precipitated gold after separation thereof and for the filtrate from the process to be boiled with formic acid to cause precipitation of any gold therein.

Evaporation to dryness with nitric acid is effected in order to form the nitroso chloride complexes of the metals present.

Still further features of the invention will become apparent from the following description of one preferred application thereof which embodies a specific example wherein the amounts of reagents used are given in parentheses.

DETAILS

In general, concentrates of PGMs and gold are obtained as a matte leach residue or sludge which is processed from this stage to obtain the desired metals and for this reason the following description will start from the processing of such a matte leach residue or sludge.

Figure 2:
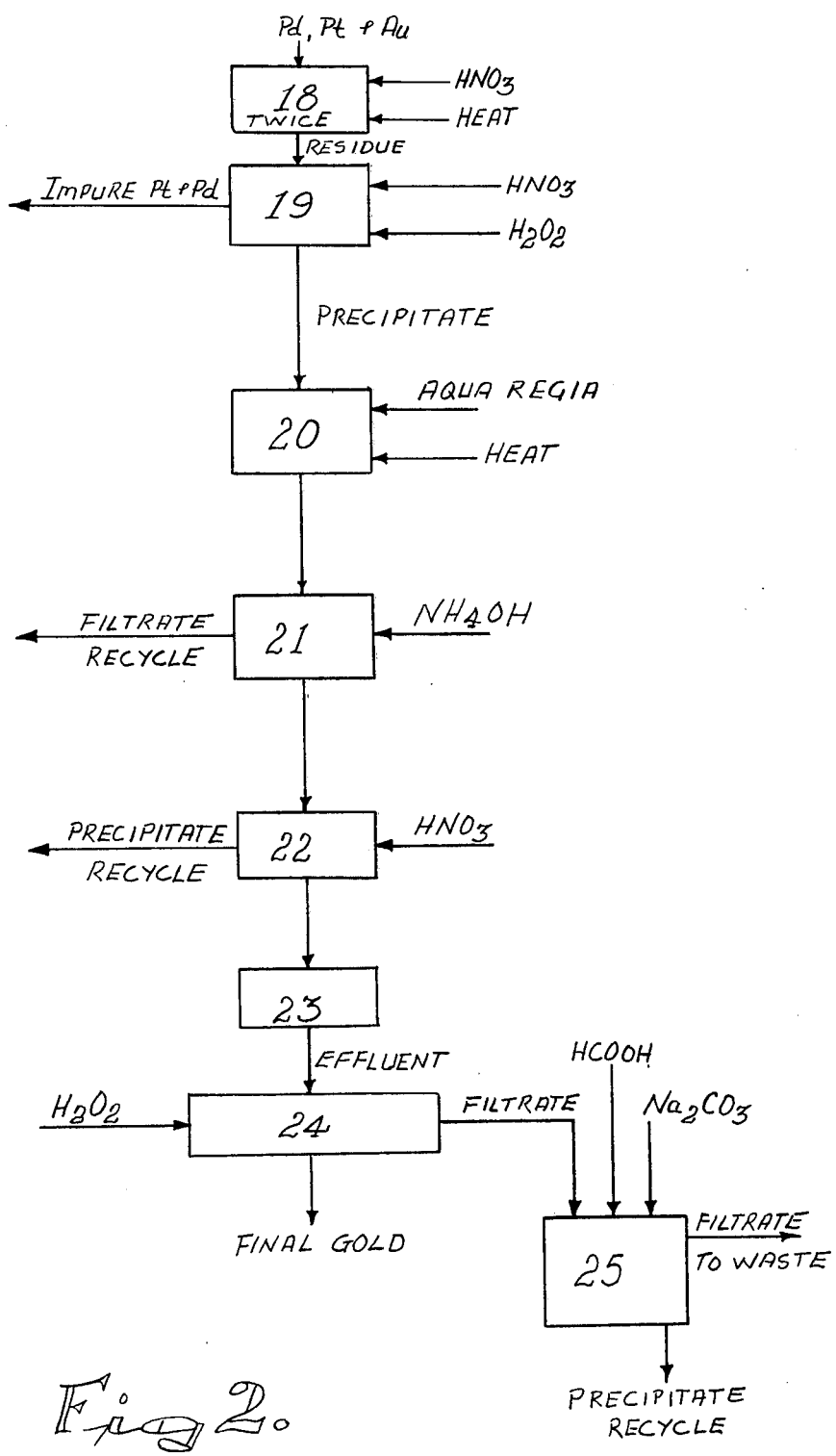

In the description reference is made to the accompanying flow sheets in which:

FIG. 1 is a flow sheet illustrating the general processing of the matte leach residue; and FIG. 2 is a flow sheet showing the further separation and purification of gold.

The sludge used as a starting material in this embodiment contains the following:

| Element | | Percent | Element | | Percent |
|---|---|---|---|---|---|
| Platinum | (Pt) | 6.92 | Copper | (Cu) | 6.91 |
| Palladium | (Pd) | 3.04 | Cobalt | (Co) | 0.19 |
| Gold | (Au) | 0.59 | Iron | (Fe) | 4.57 |
| Rhodium | (Rh) | 0.32 | Magnesia | (MgO) | 0.35 |
| Ruthenium | (Ru) | 0.60 | Nickel | (Ni) | 3.50 |
| Iridium | (Ir) | 0.08 | Organic matter | $[Cn(H_2O)_m]$ | 23.10 |
| | | | Potassium | (K) | 0.03 |
| Silver | (Ag) | 0.03 | Silica | $(SiO_2)$ | 12.92 |
| | | | Sodium | (Na) | 9.25 |
| Alumina | $(Al_2O_3)$ | 3.60 | Sulfur (Total) | (S) | 19.63 |
| Antimony | (Sb) | 0.05 | Tellurinum | (Te) | 0.29 |
| Bismuth | (Bi) | 0.11 | Zinc | (Zn) | 0.001 |
| Calcium Oxide | (CaO) | 0.49 | Other $+ O_2 + H_2O$) | | |
| | | | | (By diff) | 3.43 |
| | | | | | 100.00 |

2.5 kilograms (kg) of the sludge is first roasted in a stream of air at 600° C for 2 hours in order to convert any sulfides and free sulfur to oxides at stage 1.

The roasted material is boiled at stage 2 for 2 hours with 20% $H_2SO_4$ [3 liters (l)] under reflux with stirring, cooled to ±55° C and filtered to dissolve the bulk of the base metals present.

Calcium oxide (CaO) is added at stage 3 to the filtrate to precipitate all the nickel, copper, PGMs and gold in the filtrate. This precipitate, which contains 30 milligrams (mg) platinum, 100 mg palladium, 10 mg gold, 50 mg rhodium and 40 iridium, is kept. In practice such precipitate would be recycled to a matte smelter.

The residue obtained after the sulfuric acid treatment is then leached at stage 4 with aqua regia (1½ l) for 3 hours. This aqua regia leach and all subsequent aqua regia leachings are carried out as follows:

The material is boiled with the required amount of hydrochloric acid (HCl) under reflux for 30 minutes. The required quantity of nitric acid ($HNO_3$) is then added slowly over a period of 60 minutes. The mixture is then allowed to boil for the remaining length of time (i.e. 1½ hours).

Sodium bromate ($NaBrO_3$) [30 30 (g)] is then added to the solution, which is allowed to boil for a further 30 minutes after diluting the solution with water (1.5 – 3 l) to oxidize the PGMs and gold to their highest stable oxidztion states. The pH is then adjusted to 6.5 with sodium carbonate (±60° C) (1 kg) to precipitate all the metals except platinum as their hydrated oxides. The solution is allowed to stand for 20 minutes and then filtered under vacuum. The platinum is removed in this manner in order to decrease the bulk of the PGMs and gold (to be subjected to lead alloying) by about 50%.

Formic acid (0.2 l) is added to the filtrate [+90% of platinum (Pt) in the feed] at stage 5 and the resulting solution is boiled under reflux with stirring for 5 hours. Sodium carbonate ($Na_2CO_3$) (0.3 kg) is added at stage 6 step-wise over a period of 1 hour until a pH 5.0 is obtained. The solution is then boiled for a further 60 minutes, cooled to 60° C and filtered under vacuum. These steps 5 and 6 are performed in order to precipitate platinum in solution.

The filtrate is passed over an anionic exchange column at stage 7 and the effluent discarded. This effluent contains 100 mg Pt, 10 mg Pd, 10 mg Au, 1 mg Rh and 25 mg Ir.

The precipitate is dissolved at stage 8 in aqua regia (1.0 l), cooled and filtered. The obtained residue is silver chloride (AgCl).

This aqua regia filtrate contains the bulk of the platinum. This platinum is combined with the bulk of the palladium and gold as described hereinafter, and separation of these PGMs is effected by a separate procedure.

The residue/precipitate obtained from the initial aqua regia leach and sodium carbonate precipitated at stage 4 (+1400 g) are mixed with a Flux A and a Flux B defined below and fused at stage 9 for 75 minutes at 1140° C. The result of this is that the rhodium is, for the most part, converted from an aqua regia insoluble form to an aqua regia soluble form. Also the solubility in aqua regia of the iridium and ruthenium is further decreased. 2.5 kg of Flux A per kg of residue and 335 g of Flux B per 100 g of PGM + Au to be collected are used. These fluxes have the following compositions:

FLUX A (active flux) (3.5 kg)
1. Borax ($Na_2B_4O_7$) : 20% (0.75 kg)
2. Sodium carbonate ($Na_2CO_3$) : 80% (2.75 kg)

FLUX B (Collector) (0.55 kg)
1. Litharge (PbO) : 90% (0.5 kg)
2. Charcoal (C) : 10% (0.05 kg)

The molten material is poured into iron moulds where it is allowed to cool. Thus-obtained lead buttons are separated from the slag, and the slag is crushed and kept; in practice such slag would be returned to the matte smelter. The slag contains 520 mg Pt, 230 mg Pd, 45 mg Au, 24 mg Rh, 45 mg Ru (ruthenium) and 5 mg Ir.

The lead buttons are crushed and then boiled at stage 10 for 5 hours under reflux with 20% $HNO_3$ (5.5 l) in order to remove lead. The solution is cooled to 55° C and filtered under vacuum. The residue is fed to a subsequent aqua regia leach step indicated at stage 11.

Formic acid (0.05 l) is added at stage 12 to the filtrate from the nitric acid leach of stage 10 and the pH adjusted to 2.0 with sodium carbonate ($Na_2CO_3$) (0.3 kg) to precipitate any PGMs and gold dissolved by the nitric acid. The solution is then stirred for 5 hours at room temperature and filtered under vacuum.

The precipitate obtained is combined with the residue obtained from the nitric acid leach step at stage 10 and fed to the aqua regia leach step at stage 11. $NH_4OH$ is added at stage 13 to the filtrate to precipitate the lead and any PGM + Au present, and this precipitate is dried — ignited; in practice it would be returned to the lead fusion step at stage 9.

The combined residue/precipitate is boiled at stage 11 with aqua regia (0.75 l) for 3 hours under reflux. The solution is cooled to 55° C and filtered under vacuum. The residue forms part of the feed to the process for separating rhodium, iridium and ruthenium from each other. This residue contains 850 mg Pt, 700 mg Pd, 100 mg Au, 5000 mg Rh, 14720 mg Ru and 1420 mg Ir. The precious metals usually make up approximately 50% of this by metal concentrate, the remaining 50% being lead chloride ($PbCl_2$).

To the filtrate from the aqua regia leach step at stage 11 the stoichiometric amount of $H_2SO_4$ plus a 10% excess (100 ml of 50% $H_2SO_4$) is added at stage 14 to precipitate lead present in this solution. The solution is boiled for 30 minutes, cooled to 55° C and filtered.

The precipitated lead sulfate is ignited at stage 15 to litharge (PbO) and is ready to be recycled to the lead fusion step.

The filtrate from the lead precipitation step is evaporated to dryness at stage 16, and thus-obtained salts are ignited at 600° C for 2 hours. This temperature is important in rendering rhodium insoluble in the residue aqua regia.

The ignition product is then boiled at stage 17 with aqua regia (0.75 l) under reflux for 3 hours. The solution is cooled and filtered under vacuum.

The residue is combined with the residue from the aqua regia leach step of stage 11 effected after alloying to give a combined feed for the separation of the secondary PGMs, namely: rhodium, ruthenium and iridium, having a PGM and gold content of 1130 mg Pt, 850 mg Pd, 120 mg Au, 7480 mg Rh, 14920 mg Ru and 1720 mg Ir.

The filtrate, obtained from the final aqua regia leach step 17, is combined with that obtained in the aqua regia leach step of stage 8 performed on the metals dissolved in the initial leach step 4 to provide a feed for the separations process of platinum, palladium and gold. This feed has a PGM and gold content of 171,210 mg Pt, 74,790 mg Pd, 14,560 mg Au, 200 mg Rh, 25 mg Ru and 210 mg Ir.

The aqua regia (1.75 l) filtrates are evaporated to dryness in Teflon dishes, and the salts are allowed to bake on a hotplate for 30 minutes and then evaporated to dryness with two equal portions of concentrated nitric acid (2 × 0.55 l) at 18.

The salts are then baked again for 30 minutes.

The dried salts are then dissolved by boiling at 19 with 10% nitric acid (2 l) to obtain a 150 g/l precious metal solution. The solution is then diluted to 100 g/l precious metal with cold water (2 l + 3 l).

1 ml of $H_2O_2$ per gram of precious metal (300 ml) is then added, and the solution is again brought to boil and allowed to boil for 30 minutes. The solution is cooled to 55° C and filtered under vacuum.

The precipitate is fed to the gold purification cycle starting at the step indicated by numeral 20.

This precipitate (obtained using the present invention) has the following constituents therein: 50 mg Pt, 10 mg Pd, 13750 mg Au, 40 mg Rh and a trace of ruthenium.

This impure gold is dissolved in aqua regia (0.06 l) at stage 20. The solution is evaporated to dryness and the salts boiled at stage 21 with $NH_4OH$ (0.06 l) to dissolve any silver chloride. The solution is cooled to 55° C and filtered. The filtrate, which contained only a trace of silver, is discarded.

The residue is dissolved in boiling 5% $HNO_3$ (0.6 l) at stage 22. The insoluble residue is filtered off; in practice it would be recycled to a suitable point.

The filtrate is passed over cationic resin Dowex 50 × 8 at stage 23. The resin retains base metals, and the gold is washed through with water.

$H_2O_2$ (0.03 l) is added to the effluent at 24 and boiled for 30 minutes to precipitate the gold. After cooling to 55° C, the solution is filtered.

The dried precipitate is the final gold having a purity of better than 99.97% gold.

The overall yield is Au = 9,000 mg, which is approximately 60%.

The gold in the filtrate is precipitated by boiling the solution with formic acid (12 ml) at stage 25 and adjusting the pH of the solution to 5.0 with $Na_2CO_3$ (10 g). The solution is cooled and filtered. The filtrate, which contains no precious metals, is discarded. The precipitated metal would, in practice, be recycled to a suitable step.

Thus, high purity gold is obtained using the process of the invention, this being done easily and effectively.

What is claimed is:

1. In separating gold from one or more PGMs, the improvement which comprises:
   a. evaporating to dryness a nitric acid solution comprising gold and one or more PGMs,
   b. dissolving residue obtained from (a) in nitric acid to produce nitric acid solution,
   c. adding hydrogen peroxide to and boiling the nitric acid solution obtained from (b) to precipitate gold in metal form.

2. A process according to claim 1 which comprises preliminarily dissolving values of gold and of one or more PGMs in nitric acid and then evaporating the resulting nitric acid solution to dryness to form nitroso chloride complexes of metals in the solution.

3. A method according to claim 1 of separating gold from a gold/PGM admixture comprising evaporating, at least once, to dryness a nitric acid solution comprising gold and one or more PGMs to form nitroso chloride complexes of such metals, dissolving resulting residue in nitric acid, adding hydrogen peroxide to and boiling the resultant solution to precipitate and coagulate gold as the metal.

4. A method as claimed in claim 3 in which the PGM containing solution of gold is evaporated to dryness with nitric acid twice prior to precipitation with hydrogen peroxide.

5. A method as claimed in claim 3 in which the precipitated gold is redissolved in aqua regia, precipitated by means of ammonium hydroxide, dissolved in nitric acid and again precipitated by means of hydrogen peroxide to yield a final gold product.

6. A method as claimed in claim 3 in which hydrogen peroxide is used in an amount of about 1 ml per gram of gold to be precipitated.

* * * * *